(12) United States Patent
Manual et al.

(10) Patent No.: US 6,656,057 B2
(45) Date of Patent: Dec. 2, 2003

(54) GOLF CLUB GRIP

(75) Inventors: Franco C. Manual, Haleiwa, HI (US); Hong-Sung Chu, 7F, No. 189, Pei-Hsin Rd., Tien-Shui Chen, Taipei Hsien (TW)

(73) Assignee: Hong-Sung Chu, Taipei Hsien (TW)

( * ) Notice: Subject to any disclaimer, the term of this patent is extended or adjusted under 35 U.S.C. 154(b) by 2 days.

(21) Appl. No.: 10/055,213

(22) Filed: Jan. 23, 2002

(65) Prior Publication Data

US 2003/0207241 A1 Nov. 6, 2003

(30) Foreign Application Priority Data

Aug. 21, 2001 (TW) ........................................ 90214276 U

(51) Int. Cl.[7] .............................................. A63B 53/14
(52) U.S. Cl. ...................................... 473/300; 473/301
(58) Field of Search ................................ 473/300, 301, 473/302, 303; 16/431; 434/247, 252

(56) References Cited

U.S. PATENT DOCUMENTS

| | | | | | |
|---|---|---|---|---|---|
| 3,311,375 A | * | 3/1967 | Onions | ........................ | 473/301 |
| 4,284,275 A | * | 8/1981 | Fletcher | ........................ | 473/549 |
| 4,941,232 A | * | 7/1990 | Decker et al. | ................. | 16/421 |
| 5,427,376 A | * | 6/1995 | Cummings et al. | ......... | 473/201 |
| 5,571,050 A | * | 11/1996 | Huang | ........................ | 473/300 |
| 5,584,482 A | * | 12/1996 | Huang | ........................ | 473/301 |
| 5,634,859 A | * | 6/1997 | Nesbitt | ........................ | 473/301 |
| 5,846,629 A | * | 12/1998 | Gwinn | ........................ | 428/68 |
| 5,895,329 A | * | 4/1999 | Huang | ........................ | 473/302 |

* cited by examiner

*Primary Examiner*—Kien T. Nguyen
(74) *Attorney, Agent, or Firm*—Pitney, Hardin, Kipp & Szuch LLP

(57) ABSTRACT

A golf club grip includes a molded or shaped tubular foam body of closed-cell foam material and an anti-slip rubbery skin bonded integrally to an outer surface of the tubular foam body, thus a slip-on type of this invention is formed. The closed-call foam provides advantages, such as light weight with correct or standard size, a wide range of size and grip weights for personal choice. The tubular foam body has a capped end to cap a grip-mounting portion of a golf club shaft. In an embodiment of coiled strip type, the tubular foam body is cut spirally to form a coiled strip that can be wrapped spirally around the grip-mounting portion, and the capped end is formed as a cap which is integral with the coiled strip.

21 Claims, 8 Drawing Sheets

GOLF CLUB GRIP

BACKGROUND OF THE INVENTION

1. Field of the Invention

The present invention relates to a golf club grip, more particularly to a golf club grip made from close-celled foam with anti-slip skin to result in lighter weight, adequate rigidity and resilience, sufficient shock absorbing property, and ease of installation.

2. Description of the Related Art

Referring to FIG. 1, a golf club 1 typically includes a club head 11, a club shaft 13 extending from the club head 11 and having a butt end 132 opposite to the club head 11, and grip 12 disposed over a gripping portion proximate to the butt end 132 of the shaft 13. The grip 12 is the only direct link between the golf club 1 and a golfer. Golf swing has been described as a violent movement. A golfer may exert enough force on the golf club 1 to enable the club head 11 to travel fast at impact. It is thus imperative that each grip 12 fit the individual golfer. That is, each grip 12 must have the proper thickness for the particular golfer. The thickness of the grip 12 can not only affect the way a golfer holds the golf club 1, but can also affect the golf swing and shot pattern of the golf ball.

The total weight of the golf club 1 is the sum of the weights of its component parts, i.e., the club head 11, the club shaft 13, and the grip 12. The swing weight is the weight the golfer feels in relation to the head weight of the club as he swings the golf club 1. Swing weight is generally defined as the weight distribution between the club head 11 of the golf club 1 and the butt end 132 of the golf club 1 about a fixed fulcrum point. All the weight toward the grip end from the fulcrum point is considered to be "grip weight". All the weight toward the club head 11 of the golf club from the fulcrum point is "head weight." The more head weight there is relative to the grip weight results in a higher swing weight. Conversely, the less head weight there is relative to the grip weight results in a lower swing weight. Any change in head weight or grip weight, and any change in the component parts of the golf club 1 can alter the swing weight of the golf club 1. If all other components of the golf club 1 are kept constant, a heavier grip will result in more weight in the butt end 132 of the golf club 1 relative to the club head 11, and therefore a decreased swing weight. Conversely, a lighter grip will result in more weight in the club head end 11 of the golf club 1 relative to the butt end 132, and therefore an increased swing weight. Golfers may find it highly advantageous to use light weight grips 12 to increase swing weight, thus creating more club head feel 11, while decreasing the total weight of the golf club 1. A lighter golf club 1 allows the golfer to swing the golf club 1 faster.

It is known that the shock generated by impact between the golf club 1 and a golf ball can adversely affect muscle tissue and arm joints. It is thus important that the grip 12 has a sufficient shock absorbing property to minimize injury to the golfer.

Moreover, because the golf swing is a violent movement, it is also essential that the grip 12 have enough traction to prevent the golfer's hands from slipping during the swing.

When it is necessary to replace the original grip, such replacement is difficult and cannot be accomplished by the average golfer. For example, to install a prior art slip-on type golf club grip, the installation steps generally includes applying a double tact tape to the golf shaft, then applying grip solvent to both the tape and inside the tubular grip to make it slick, and then sliding the grip into place. Proper installation of a modern grip requires the considerations of the golf club shaft butt size, the model grip core size, and the amount of tape used. During the replacement operation, the old grip and underlying old tape must be completely removed because any remnants of the old grip or the old tape may result in irregularities in the new grip that can be felt by the golfer and that may result in an adverse affect on the performance of the golfer. Therefore, grip installation is often a difficult, tedious and time-consuming process. Many golfers thus choose the more expensive route and have their grips professionally installed by leaving their golf clubs at a golf shop for several days when conducting grip replacement.

Referring to FIG. 2, for prior art easy installation, a strip-type golf club grip 2 has been disclosed. The grip 2 includes a strip 21 woundspirally about the golf club shaft 13 between the butt end 132 and a guide cylinder 22 on the shaft 13, and a cap 23 affixed to the butt end 132 to prevent the strip 21 from unraveling. The strip 21 has side edges 210 disposed in close abutment with each other.

The followings are some of the prior arts disclosing various strip-type golf club grips, of which:

U.S. Pat. No. 2,721,741 to Prendergast discloses a golf grip that has a "cylindrical cap portion with a key slot adapted to fit over the end of the shaft", and an integral strip portion. Prendergast suggest that the user or grip installer must make a slot on the tip of the shaft where the grip goes so that his invention may be locked into place. The inside of his grip cap has a "key" that must be positioned into the slot made on the shaft. Its inferiors are: First it need tool to cut a slot at the end of the shaft, causing the difficulties in process. Secondly after winding the strip around the shaft, then pull the strip to position the cap onto the end of the shaft, it makes the regripping process harder for individual golfer to do it by themselves. These disadvantages are against its original easy installation object.

U.S. Pat. No. 4,174,109 to Gaiser discloses a golf club grip made of an open-cell plastic foam tape that is spirally wound about a golf club shaft, with an open edge seam between adjacent wraps. An adhesive tape is attached to the edge of the reticulated foam tape and spirally wound about the shaft and overlies the open edge seam and adjacent edge of the foam tape, thereby resulting in a gripping surface of interspaced spiral wraps of the foam tape and the adhesive tape. However, the use of the open-celled structure for the foam tape makes the grip very soft and prevents the grip from providing firm support.

U.S. Pat. Nos. 5,816,933 and 5,813,921 to Huang disclose a composite strip made of an open pored fabric as base material (such as felt layer) and a closed pored polyurethane synthetic leather as outer layer to form variant kinds of golf grips. Basically, this kind of grip includes a strip spirally wrapped around the shaft, and a cap telescopically installed on the end of the shaft to prevent unraveling. In other words, this type of grip needs two processes for installation. There is a weak part between the cap and the strip, because the cap is separately installed on the end of the shaft not integral with the strip, tending to unravel after certain time of using. Moreover, the strip is too thin, soft and flat. The thickness of the strip is hardly over 2.5 mm, only fit to the bigger size shaft (0.790"~0.865"). Due to its strip base material, open pores fabric (felt layer), which is not rigid enough, the grip cannot provide enough support when strike like conventional golf rubber or TPR grip. This kind of grip can also be installed by spirally wrapping the strip around a resilient tube, then the shaft is slipped into the underlisting tube (as in U.S. Pat. 5,813,921 to increase the grip thickness). Because the strip is wrapped around the tube, the tube is bound and stretching thereof is limited, there by making the tube hard to open for inserting the shaft. This drawback is adverse to its original easy installation object.

SUMMARY OF THE INVENTION

It is therefore an object of the present invention is to provide a lightweight golf grip with correct or standard thickness that can decrease grip weight and increase swing weight, thereby allowing higher club head speed.

Another object of this invention is to provide a golf grip which is elastomerically rigid enough so as to absorb shock with firm support at impact when the golf club strikes a golf ball.

Still another object of this invention is to provide a golf club grip with an outer anti-slip skin to prevent the golf club from twisting or slipping in a golfer, hands.

Yet another object of this invention is to provide a golf club grip of one-piece construction having a cap and a coiled strip connected integrally to the cap for easy installation.

A further object of this invention is to provide a strip-type golf club grip with a reinforcing member to prevent the strip from unraveling.

Accordingly, the present invention provides a golf club which comprises a shaft with a grip mounting portion, a tubular foam body mounted on the grip mounting portion, and an anti-slip rubbery skin. The foam body is formed from a closed-cell foam material, and includes a capped end, an open end opposite to the capped end, and an outer surface extending between the capped end and the open end. The anti-slip rubbery skin extends around and covers at least a portion of the outer surface of the tubular foam body.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
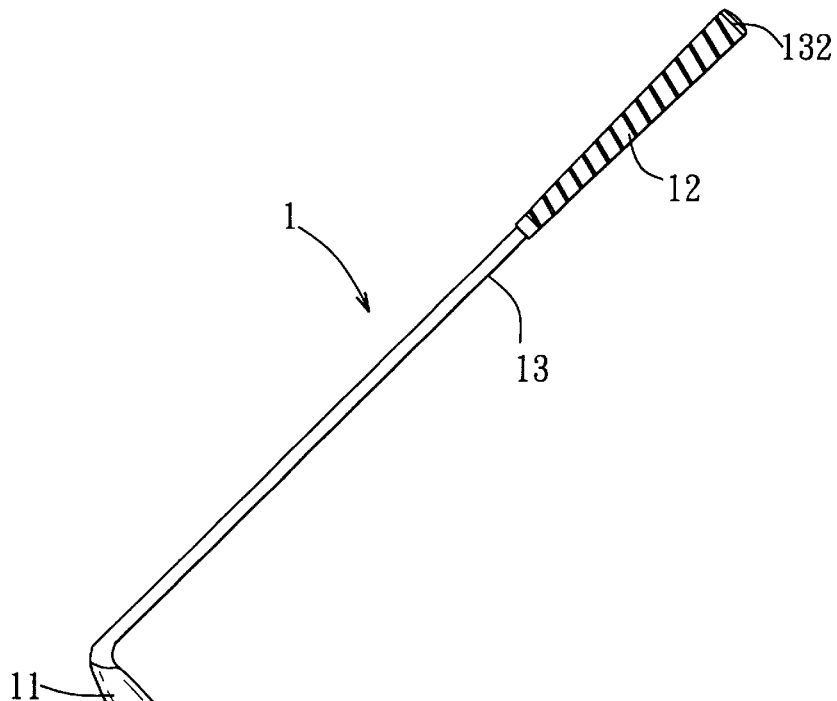
FIG. 1 illustrates a conventional golf club.
Figure 2:
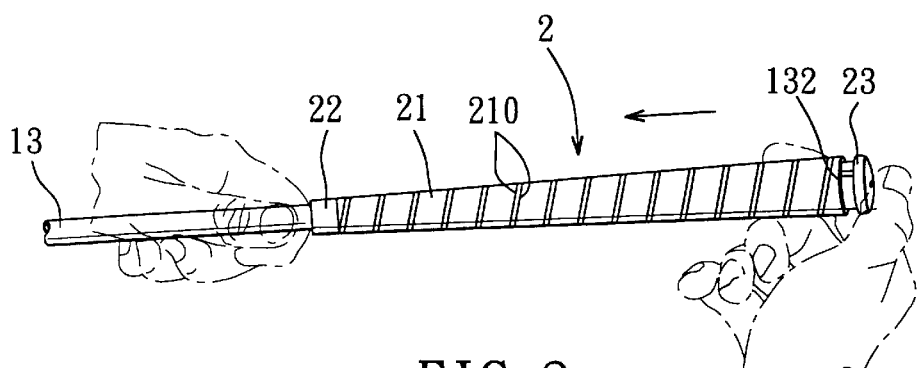
FIG. 2 illustrates a golf club incorporating a conventional strip-type grip.
Figure 3:
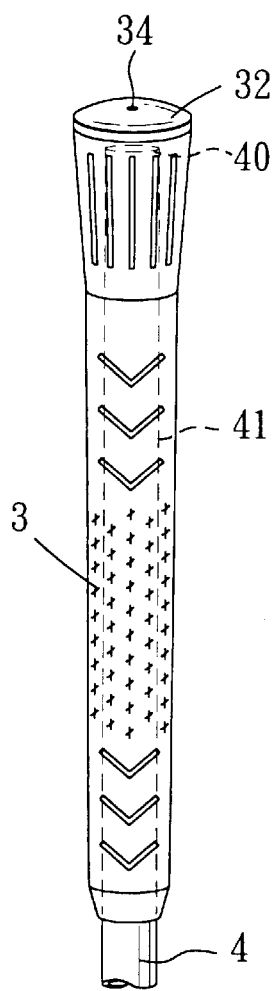
FIG. 3 is a perspective view of a first preferred embodiment of the golf club grip of the present invention.
Figure 4:
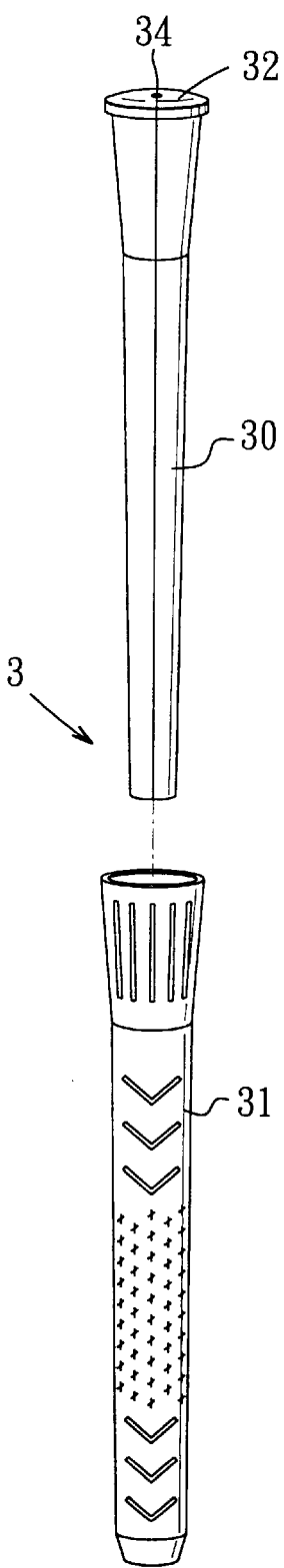
FIG. 4 is an exploded perspective view of the golf club grip of FIG. 3.
Figure 5:
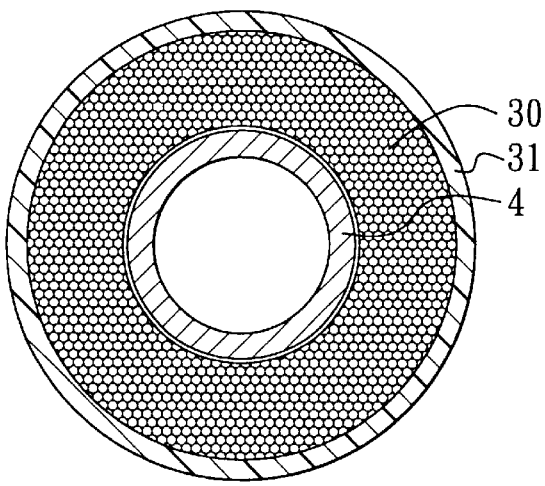
FIG. 5 is a cross-sectional top view of the golf club grip of FIG. 3.

Before the present invention is described in greater detail, it should be noted that like elements are denoted by the same reference numerals throughout the disclosure.

Referring to FIGS. 3 to 6, in the first preferred embodiment of the present invention, a golf club grip is shown to be in the form of a slip-on type hollow grip body 3 that is installed on a grip mounting portion 41 of a golf club shaft 4 adjacent to a butt end 40.

The grip body 3 is unitary and includes a molded or shaped tubular foam body 30 to be sleeved around the grip mounting portion 41 of the golf club shaft 4, and an anti-slip skin 31 bonded or laminated integrally to and covering the tubular foam body 30. The foam body 30 is tapered and has a substantially bulbous shape, and is formed from a close-celled foam material. The foam body 30 has an open end and an opposite capped end 32 covering the butt end 40 of the golf club shaft 4 and formed with a vent hole 34. The anti-slip skin 31 is preferably fused or bonded or laminated to an outer surface of the foam body 30.

The close-celled foam material may be an ethylene vinyl acetate foam, or other plastic or rubber foam of close-celled foam structure, such as polyurethane foam. An ethylene vinyl acetate (EVA) foam is preferably used. The EVA foam is a rigid, cross-linked close-celled uni-cellular plastic foam, retaining its thermoplastic elastomeric character for the vinyl acetate and polyethylene contents, respectively.

The EVA foam is produced from EVA pellets, calcium carbonate, talc, a coloring agent, a foaming agent or chemical blowing agent, such as Nitrosan, and a cross-linking agent, such as dicumyl peroxide (DCP). These ingredients are mixed to form an unfoamed raw EVA resin. During manufacture, the unfoamed EVA resin is placed in a heated mold with very little space for expansion. The foaming agent or the chemical blowing agent and the cross-linking agent may be activated at different temperatures in the mold. The activating temperature for the foaming agent is preferably lower than that for the cross-linking agent. The mold is heated to cause decomposition of the foaming agent to liberate a gas, usually nitrogen, first. The raw material is melted during the heating process. At this stage, the internal pressure of the mold is increased, and the resulting high pressure causes the gas to dissolve in the EVA resin in the form of uniformly sized microscopic bubbles, thus forming the closed-cell structure of the EVA foam. After the above chemical-blowing step, the internal temperature is kept higher to activate the cross-linking agent, allowing reswelling of the EVA foam by strengthening the stiffness and increasing the thickness of the cell wall. In the same volume of the same foam material, the amount and sizes of bubbles in the material effects the density of the foam.

From this manufacturing process, the EVA foam can be formed with a hardness ranging from approximately 40 to approximately 70 in the ASTM D2240 C Type hardness scale, which is the operable range of the present invention. Preferably, the EVA foam is formed with an ASTM D2240 C Type hardness between approximately 56 to 65. More preferably, the EVA foam is formed with an ASTM D2240 C Type hardness of 58 to 62. Though being thermoplastic and elastomeric, the EVA foam retains rigidity due to the cross-linking step. Because air is closed in the cells which are independently connected to each other, the closed-celled cellular foam structure allows the EVA foam to have greater shock absorbing property than conventional rubber. The resulting EVA foam is 3 to 25 times thicker than the original EVA resin. This results in low density, ranging from about 0.12 g/cm$^3$ to about 0.3 g/cm$^3$, and thus lightweight.

The anti-slip skin 31 has a thickness varying from 0.2 mm to 3 mm, preferably 0.7 to 2 mm, and preferably has an even thickness along the length of the grip body 3. The skin 31 may be formed from natural or synthetic rubber, thermoplastic elastomers (TPE), thermoplastic rubber (TPR), polyurethane (PU) synthetic leather, natural or synthetic leather, or other equivalent material. Rubber or rubber compound is preferred.

The skin 31 may be applied to the foam body 30 in numerous ways. It can be formed as a sheet and then bonded or fused or laminated to the outer surface of the foam body 30. Alternatively, the skin 31 may be formed as a one-piece tube. In this case, confronting surfaces of the skin 31 and the foam body 30 are primed and then applied with cement. The tube-shaped skin 31 is then stretched, and the foam body 30 is positioned within the stretched tube-shaped skin 31. When the tube-shaped skin 31 is released, the cement causes it to bond to the foam body 30.

Alternatively, the tube-shaped anti-slip skin 31 may be fabricated to form a tube which can be applied to the foam body 30 by unrolling the tube over the foam body 30. Furthermore, two or more sheet materials may be laminated together to form a composite skin, which allows the skin to have greater shock absorbency, or have varying weight, softness or rigidity.

If desired, the anti-slip skin 31 may be partially applied to the foam body 30, in a particular pattern or at random, to create an anti-slip surface on the foam body 30. The skin 31 may serve a decorative purpose, by being manufactured in a variety of colors, or contain patterns, textures, hardness, designs or logos on the skin 31.

Figure 7:
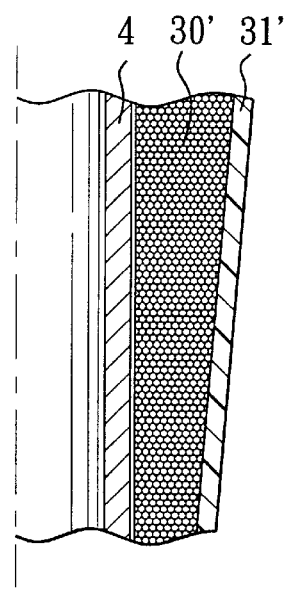
FIG. 7 is a fragmentary longitudinal sectional view of a second preferred embodiment of the golf club grip of the present invention.
Figure 6:
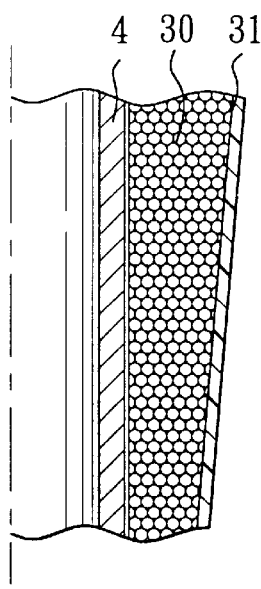
FIG. 6 is a fragmentary longitudinal sectional view of the golf club grip of FIG. 3.

By changing the combination of the thickness and density of the foam body 30 and the anti-slip skin 31, this invention can provide a wide range of grip weights without sacrificing the correct or standard grip size. For instance, as shown in FIG. 7, the grip of the present invention may be formed to have a foam body 30' of higher density and a thicker anti-slip skin 31'.

Figure 8:
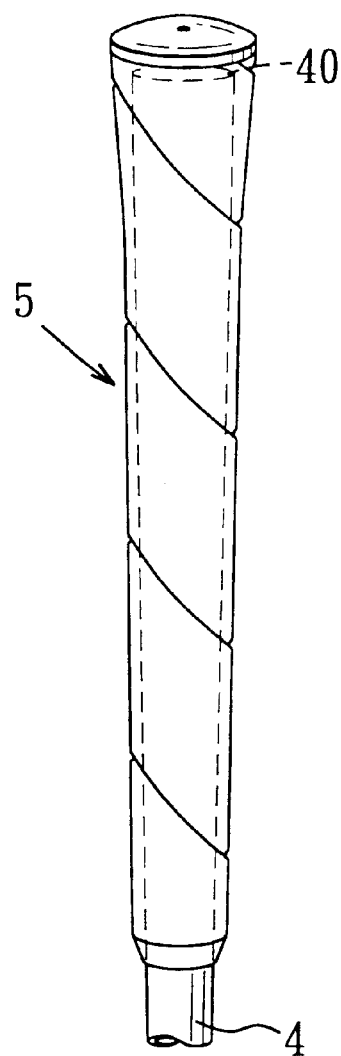
FIG. 8 illustrates the golf club of the present invention when tailored spirally at a predetermined distance and angle to form a strip-type grip.
Figure 9:
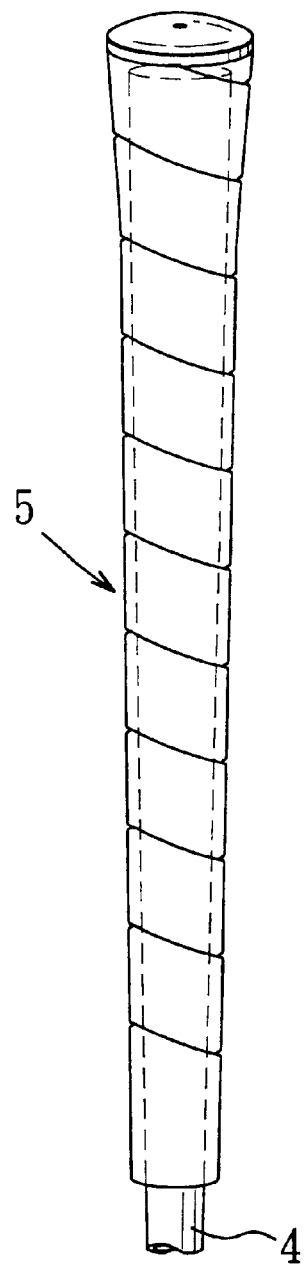
FIG. 9 illustrates the golf club grip of the present invention when tailored spirally at another distance and angle different from those in FIG. 8.
Figure 10:
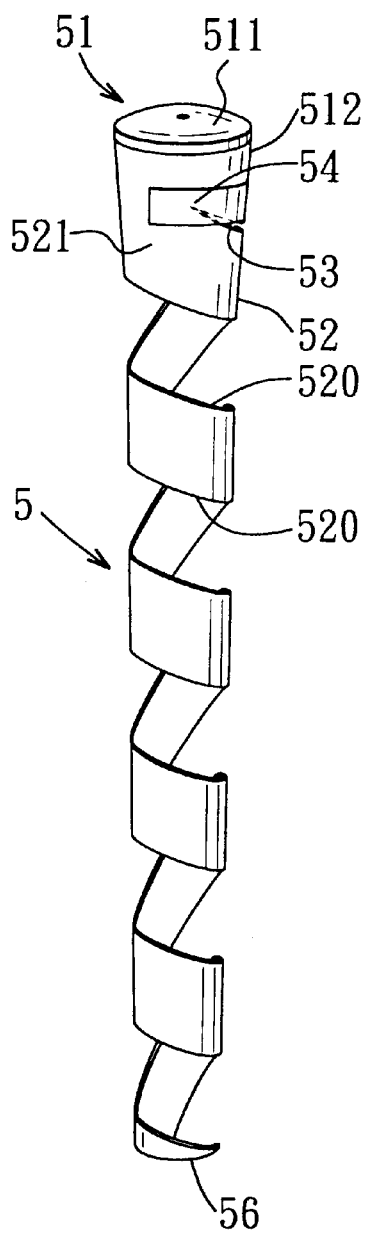
FIG. 10 is a perspective view of a third preferred embodiment of the strip type golf club grip of the present invention.

Referring to FIGS. 8 to 10, for easy installation to a golf club shaft, the golf club grip of the present invention may be formed into a coiled strip-type grip 5, by spirally cutting the above-described grip body 3 to form a coiled strip 52 and a cap 51 integral with the coiled strip 52. The grip body 3 is spirally cut in different widths or patterns, as shown in FIGS. 9 and 10. The cap 51 has a closed end 511 to cap the top end of the golf club shaft 4, and a rim 512. The coiled strip 52 has a tip end 56, and a cap connecting end 521 connected integrally to the rim 512 of the cap 51. This spiral cutting creates two side edges 520 extending longitudinally and spirally along the length of the coiled-strip 52. A sharp slit 53 is formed between the cap connecting end 521 of the coiled strip 52 and the rim 512 of the cap 51 at a location where the spiral cutting starts.

Figure 11:
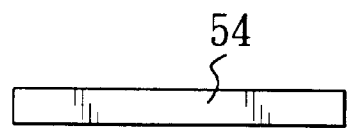
FIG. 11 illustrates a reinforcing member used in the third preferred embodiment of the golf club grip of the present invention.
Figure 12:
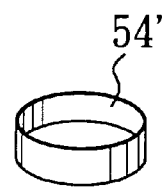
FIG. 12 illustrates a modified reinforcing member for use in the strip type golf club grip of the present invention.

A reinforcing member 54, which is a strong stretchable rubber or rubber-like band as shown in FIG. 11, is bonded to the cap connecting end 521 of the coiled strip 52 and the rim 512 of the cap 51 and extends over the slit 53 so as to reinforce the connection between the rim 512 and the cap connecting end 521 of the coiled strip 52, to prevent the cap connecting end 521 from breaking off from the cap 51, and to enhance tight fitting strength of the cap 51 to the golf club shaft 4. In a modified embodiment, the reinforcing member 54 maybe formed as a plate, a string, or a ring 54' as shown in FIG. 12.

The thickness of the coiled strip 52 is tapered from the cap connecting end 521 to the tip end 56 so that the grip 5 tapers in a longitudinal direction of the golf club shaft 4 from the cap 51 to the tip end 56 of the coiled strip 52. The variance in thickness of the coiled strip 52 between the thicker end, i.e., the cap 51, and the thinner end, i.e., the tip end 56, ranges from about 1 mm to about 6 mm, preferably about 3 mm.

The finished slip-on type grip body 3 and coiled strip-type grip 5 both provide a grip weight of from about 20 gm to about 50 gm, preferably from about 28 gm to about 32 gm.

Figure 13:
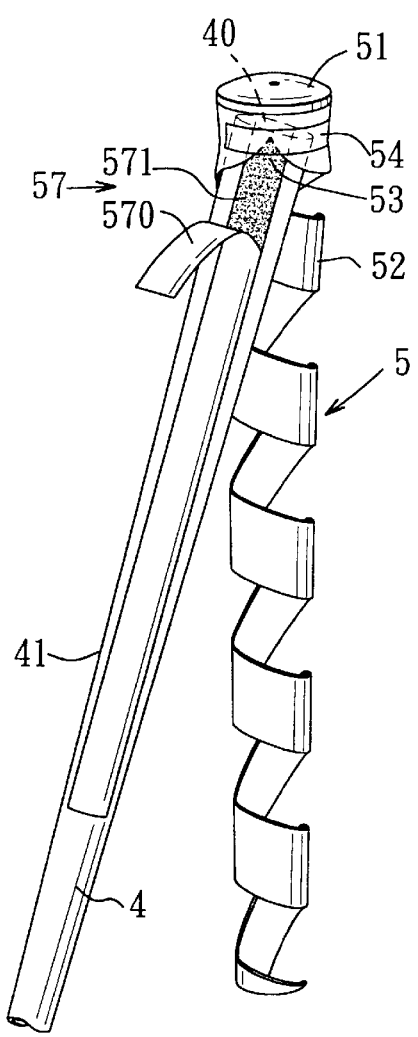
FIGS. 13 and 14 illustrate steps in one installing process for installing the strip type golf club grip of FIG. 10 to a golf club shaft.
Figure 14:
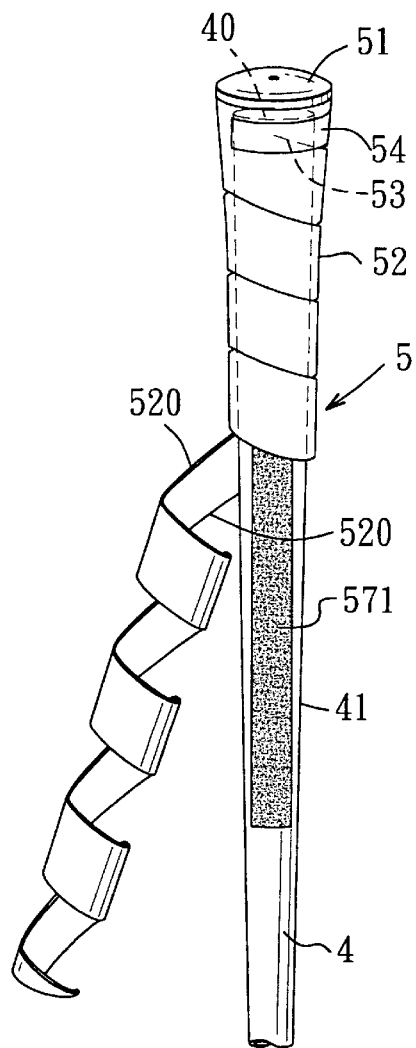
Figure 15:
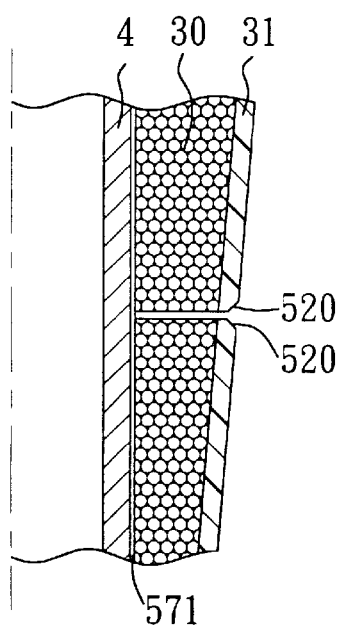
FIG. 15 is a fragmentary longitudinal sectional view of the strip type golf club grip when installed on a golf club shaft.

The followings are two methods for installing the coiled strip-type grip 5 on the golf club shaft 41:

(1) Referring to FIG. 13, a double-sided adhesive tape 57 is first attached to the grip mounting portion 41 of the golf club shaft 4 adjacent to the butt end 40. The protective sheet 570 of the tape 70 s then peeled off to leave the adhesive sheet 571. The cap 51 with the reinforcing member 54 is then forced over the butt end 40 of the golf club shaft 4, and is firmly affixed thereto by the tape 57. The coiled strip 52 is subsequently spirally wound about the grip mounting portion 41 of the golf club shaft 4, as shown in FIGS. 14 and 15, with the side edges 520 being in tight abutment with each other. One of the side edges 520 is juxtaposed closely to the end of the cap 51. Since the adhesive sheet 571 of the double-sided tape 57 is already exposed, the strip 52 is firmly affixed to the golf club shaft 4 by the tape 57 during its spiral winding about the shaft 4.

Figure 16:
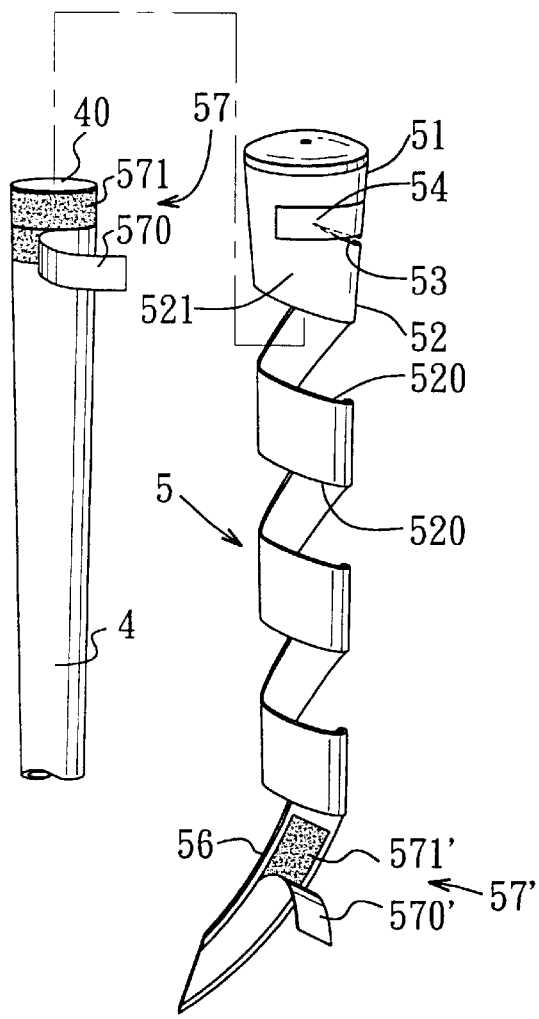
FIGS. 16 to 18 illustrate steps in another installing process for installing the strip type golf club grip of FIG. 10 to a golf club shaft.
Figure 17:
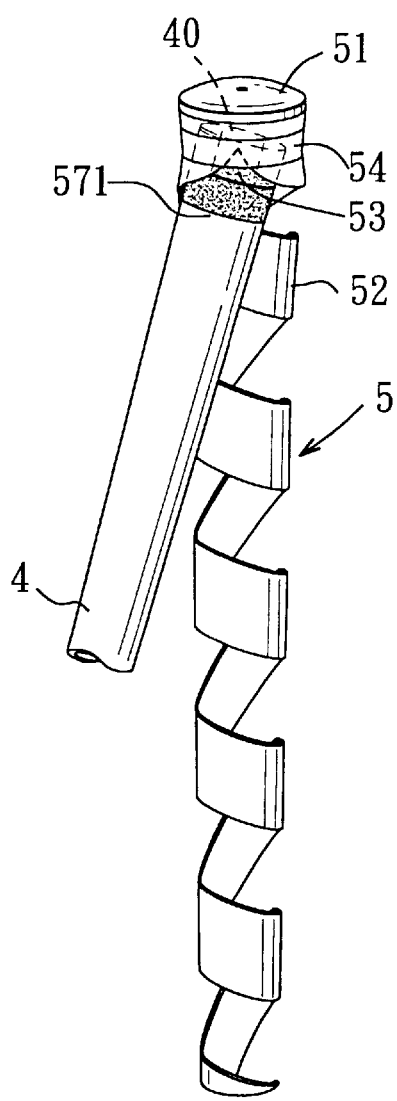
Figure 18:
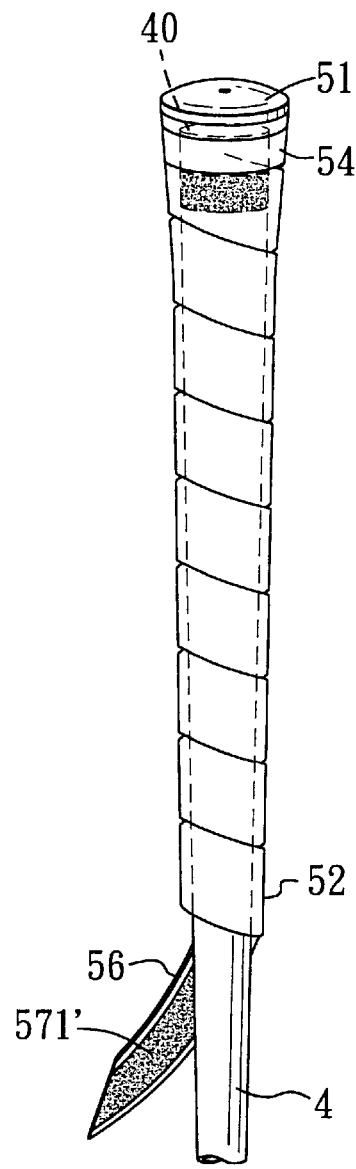

(2) Referring to FIGS. 16 to 18, the double-sided tape 57 is wrapped about the golf club shaft 4 on the butt end 40, and the protective sheet 570 is peeled off to expose an adhesive layer of the adhesive sheet 571 of about 30 mm wide. Another double-sided tape 57' is attached to an inner surface of the coiled strip 52 on the tip end 56, and the protective sheet 570' thereof is peeled off. Likewise, the cap 51 with the reinforcing member 54 is then forced over the butt end 40 of the golf club shaft 4, and the coiled strip 52 is wrapped about the golf club shaft 4, allowing the tip end 56 to be affixed to the golf club shaft 41 by the adhesive sheet 571' of the adhesive tape 57'.

It has been shown that, the present invention provides a golf club grip 3, 5 with an anti-slit surface, light weight with correct or standard size of grip thickness, and wider grip weight range without sacrificing the correct fit thickness of grip, elastomeric rigidity for enhanced shock absorbency and for firm support at impact of swing, and one-piece coiled strip type for ease of installation.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A golf club comprising:
   a shaft having a grip mounting portion; and
   a grip which includes:
   a tubular foam body mounted on said grip mounting portion and formed from a closed-cell foam material, said foam body including an integrated capped end, an open end opposite to said capped end, and an outer surface extending between said capped end and said open end, and
   an anti-slip rubbery skin extending around and covering at least a portion of said outer surface of said tubular foam body,
   wherein said closed-cell foam has a hardness in the range of 40~70 in ASTM D2240 Type C hardness scale.

2. The golf club according to claim 1, wherein said closed-cell foam material is formed from an ethylene vinyl acetate resin or other plastic or rubber closed-cell foams.

3. The golf club according to claim 1, wherein said anti-slip skin is bonded or laminated integrally to said outer surface.

4. The golf club according to claim 1, wherein said closed cell foam has a density in the range of 0.12~0.3 g/cm$^3$.

5. The golf club according to claim 1, wherein said anti-slip skin is formed from a material selected from the group consisting of natural rubber, synthetic rubber, thermoplastic elastomers, thermoplastic rubbers, polyurethane synthetic leather, natural leather, and synthetic leather.

6. The golf club according to claim 1, wherein said anti-slip skin of said grip has a thickness in the range of 0.2~3 mm.

7. The golf club as claimed in claim 1, wherein said tubular foam body of said grip includes:
   a coiled strip extending spirally and wrapped about said grip mounting portion of said shaft; and
   a cap capping one end of said grip mounting portion and formed as one piece with said coil strip, said cap having a rim extending around the grip mounting portion, said rim being connected integrally to one end of said coiled strip.

8. The golf club according to claim 7, wherein said grip further includes a stretchable reinforcing member to be positioned over said rim and said coiled strip where said rim is connected to said coiled strip.

9. The golf club according to claim 8, wherein said reinforcing member is a stretchable ring which extends around said rim and said coiled strip where said rim is connected to said coiled strip.

10. The golf club according to claim 8, wherein said reinforcing member is a stretchable band which extends around said rim and said coiled strip where said rim is-connected to said coiled strip.

11. The golf club according to claim 7, wherein said coiled strip has a cap connecting end connected to said rim, and a tip end opposite to said cap connecting end, said coiled strip further having a thickness which decreases from said cap connecting end to said tip end.

12. The golf club according to claim 11, wherein said coiled strip has a variance ranging from about 1 mm to about 6 mm between the thickness of said cap connecting end and the thickness of said tip end.

13. The golf club according to claim 11, wherein said coiled strip has a variance of about 3 mm between the thickness of said cap connecting end and the thickness of said tip end.

14. The golf club as claimed in claim 7, wherein said coiled strip has two opposite side edges extending longitudinally of said coiled strip, said coiled strip being wound around said grip mounting portion with said side edges abutting with each other, one of said side edges being in abutment with said rim of said cap.

15. The golf club according to claim 14, wherein shaft is provided with a double-sided adhesive tape which extends longitudinally on said grip mounting portion, said doubled-sided adhesive tape being bonded to said grip mounting portion and said coiled strip.

16. The golf club according to claim 1, wherein said grip has a weight ranging from 20 to 50 grams.

17. A golf club comprising:
    a shaft having a grip mounting portion; and
    a grip which includes:
    a tubular foam body mounted on said grip mounting portion and formed from a closed-cell foam material, said foam body including an integrated capped end, an open end opposite to said capped end, and an outer surface extending between said capped end and said open end, and
    an anti-slip rubbery skin extending around and covering at least a portion of said outer surface of said tubular foam body,
    wherein said closed-cell foam has a density in the range of 0.12~0.3 g/cm$^3$.

18. A golf club comprising:
    a shaft having a grip mounting portion; and
    a grip which includes:
    a tubular foam body mounted on said grip mounting portion and formed from a closed-cell foam material, said foam body including an integrated capped end, an open end opposite to said capped end, and an outer surface extending between said capped end and said open end, and
    an anti-slip rubbery skin extending around and covering at least a portion of said outer surface of said tubular foam body,
    wherein said tubular foam body of said grip includes:
    a coiled strip extending spirally and wrapped about said grip mounting portion of said shaft; and
    a cap capping one end of said grip mounting portion and formed as one piece with said coil strip, said cap having a rim extending around the grip mounting portion, said rim being connected integrally to one end of said coiled strip, and
    wherein said grip further includes a stretchable reinforcing member to be positioned over said rim and said coiled strip where said rim is connected to said coiled strip.

19. The golf club according to claim 18, wherein said reinforcing member is a stretchable ring which extends around said rim and said coiled strip where said rim is connected to said coiled strip.

20. The golf club according to claim 18, wherein said reinforcing member is a stretchable band which extends around said rim and said coiled strip where said rim is connected to said coiled strip.

21. A golf club comprising:
    a shaft having a grip mounting portion; and
    a grip which includes:

a tubular foam body mounted on said grip mounting portion and formed from a closed-cell foam material, said foam body including an integrated capped end, an open end opposite to said capped end, and an outer surface extending between said capped end and said open end, and an anti-slip rubbery skin extending around and covering at least a portion of said outer surface of said tubular foam body, wherein said tubular foam body of said grip includes:
  a coiled strip extending spirally and wrapped about said grip mounting portion of said shaft; and
  a cap capping one end of said grip mounting portion and formed as one piece with said coil strip, said cap having a rim extending around the grip mounting portion, said rim being connected integrally to one end of said coiled strip, and wherein said coiled strip has a cap connecting end connected to said rim, and a tip end opposite to said cap connecting end, said coiled strip further having a thickness which decreases from said cap connecting end to said tip end, and wherein said coiled strip has a variance of about 3 mm between the thickness of said cap connecting end and the thickness of said tip end.

* * * * *